United States Patent Office 3,071,623
Patented Jan. 1, 1963

3,071,623
DEALKYLATION OF ALKYLATED THIOPHENOLS
Robert J. Laufer, Pittsburgh, Pa., assignor to Consolidation Coal Company, Pittsburgh, Pa., a corporation of Pennsylvania
No Drawing. Filed Mar. 8, 1961, Ser. No. 94,162
10 Claims. (Cl. 260—609)

This invention relates to the dealkylation of alkylated thiophenols. More specifically, it relates to the removal of branched-chain alkyl groups from the ring of an alkyl-substituted thiophenol in the presence of anhydrous zinc chloride or aluminum phosphate as ring dealkylation catalyst.

"Dealkylation" and "ring dealkylation" are used herein synonymously to mean a splitting off of a nuclearly attached branched-chain alkyl group from the nucleus or ring. "Sulfide cleavage" refers to the splitting off of a branched-chain alkyl group attached to the sulfur atom of an alkyl aryl sulfide. "Dealkylation of an alkylated thiophenol" refers to removal of a nuclearly attached branched-chain alkyl group from a ring-alkylated thiophenol or from a sulfide thereof, unless the presence of the latter is excluded by the context in which used. "Branched-chain alkyl" refers to an alkyl group having a carbon atom attached to a nuclear carbon atom (ring) or to the sulfur atom of the S-alkylated thiophenol (sulfide), the attaching carbon of the alkyl group being a secondary or tertiary carbon atom.

The preparation of ring-alkylated thiophenols substituted in the para position of the ring with a t-alkyl group has been described in copending applications Serial Nos. 70,413, 70,405, 70,443, all filed November 21, 1960, and assigned to the assignee of this invention. The preparation of ring-alkylated thiophenols alkylated in the ortho position of the ring with a sec-alkyl group has been further described in copending applications Serial Nos. 70,424, 70,404, and 70,425, all filed November 21, 1960, and assigned to the assignee of this invention. In order to separate thiocresol isomers or to obtain certain ring-alkylated thiophenols in high purity and in high yield, or to accomplish useful syntheses, a ring dealkylation process is required. This invention is of utility, for example, in accomplishing the hitherto unknown separation and recovery of individual thiocresol isomers from mixed thiocresols, as shown in copending application Serial No. 70,657, filed November 21, 1960. Furthermore, this process enables the obtaining in high yield of a mono-sec-alkylthiophenol from a thiophenol by dealkylation of di-sec-alkylthiophenols and recycle of the thiophenol for further sec-alkylation. No methods are known in the prior art for removing an alkyl group from the ring of a thiophenol.

Accordingly, it is an object of the present invention to provide a method for dealkylating branched-chain alkylated thiophenols.

It is a further object to provide a method for removing a t-alkyl group from the para position of the ring of an alkylated thiophenol.

It is another object to remove a sec-alkyl group from the ortho position of the ring of an alkylated thiophenol.

It is yet a further object to provide a selective ring dealkylation process for dealkylating branched-chain ring-alkylated thiophenols in high yield and in high purity.

In accordance with this invention, it has been found that it is feasible to ring dealkylate a branched-chain ring-alkylated thiophenol by reacting the thiophenol under dealkylating conditions in the presence of a ring dealkylation solid acid catalyst selected from the group consisting of anhydrous zinc chloride and anhydrous aluminum phosphate. More specifically, the alkylated thiophenol is heated at selected elevated temperatures between 150 and 500° C.

The term "ring dealkylation of a branched-chain alkyl group" specifically includes the removal of a t-alkyl group from the para position of the ring of a 4-t-alkyl-thiophenol or the removal of a sec-alkyl group from an ortho position of the ring of a 2-sec-alkylthiophenol. Where methyl groups are also present on the ring of the thiophenol, e.g., as in branched-chain alkylated thiocresols and thioxylenols, the methyl groups are not affected by the dealkylation reaction. Removal of a sec-alkyl group is more difficult to accomplish than removal of a t-alkyl group. The removal of a t-alkyl group from the para position of the ring of an alkyl-substituted thiophenol is accomplished at a temperature between 150 and 500° C. and preferably between 200 and 300° C. The removal of a sec-alkyl group from an ortho position of the ring of a thiophenol is accomplished at a temperature between 150 and 500° C. and preferably between 250 and 400° C. While catalyst concentration is not critical per se, since heterogeneous catalysis is involved, too low a catalyst concentration results in a marked increase in reaction time. Catalyst concentrations of from 1 to 20 percent are preferred. Depending upon the alkyl group to be removed, the reaction temperature used, and the catalyst concentration present, reaction times in the liquid phase ranging from 10 minutes to 12 hours are suitable, lower temperatures requiring longer reaction times. Preferred branched-chain alkyl substituents on the ring include from 3 to 16 carbon atoms. An alkyl group of lower molecular weight such as isopropyl is more firmly attached to the ring than sec-butyl, and hence the removal of the latter higher molecular weight branched-chain alkyl substituent is more easily accomplished.

The choice of catalyst is a critical factor in achieving a dealkylation of practical significance and of commercial utility. A successful catalyst for accomplishing the ring dealkylation must actively and selectively remove the t-alkyl or sec-alkyl group from the ring without causing (a) concurrent dealkylation of any methyl groups present, (b) desulfurization of the thiophenol, and (c) significant sulfide formation or polymerization. It is further desirable that the catalyst be relatively inexpensive or have a sufficiently long life with respect to its catalytic activity. It should also be chemically stable and inert with respect to the various reactants and reaction products, particularly because it has been discovered that elevated temperatures are required for establishing dealkylation conditions.

Anhydrous zinc chloride and aluminum phosphate as dealkylation catalysts have been found to provide the foregoing requirements. By contrast, dealkylation catalysts conventionally used in the dealkylation of hydrocarbons and phenols at considerably milder temperatures, such as sulfuric and phosphoric acids, are ineffectual, either being inactive or highly destructive.

In accordance with this invention, the ring dealkylation of an alkylated thiophenol or a sulfide thereof may be accomplished. In the latter compound, the hydrogen attached to the sulfur atom of the thiophenol has been replaced by another substituent. Where the substituent on the sulfur atom is a t-alkyl or sec-alkyl group, removal of this t-alkyl or sec-alkyl group from the sulfur atom (sulfide cleavage) will also occur. Thus, because of the higher temperatures required to accomplish ring dealkylation compared with sulfide cleavage, a non-degrading catalyst effective for ring dealkylation is equally suitable for sulfide cleavage, where the same type of alkyl substituents are involved. In certain instances, e.g., dealkylation of t-butyl 4-t-butyl-o-tolyl sulfide or of isopropyl 2-isopropylphenyl sulfide, it is feasible to accomplish both sulfide cleavage and ring dealkylation in the same operation, the sulfide cleavage occurring first followed by ring dealkylation. However, in other dealkylation reactions because of the possible formation of undesired side products, it is preferred to ring dealkylate thiophenols rather than sulfides. Thus the S-alkyl group would first be cleaved from the sulfur atom, forming the thiophenol. The latter compound would then be isolated and ring dealkylated. This two-stage dealkylation-cleavage reaction is particularly effective where the branched-chain alkyl groups are t-alkyls.

The reactions that occur are relatively complex and for certain compounds mechanistically may involve disproportionation, isomerization, sulfide formation, and sulfide cleavage. However, it has been found that by using the process of this invention in conjunction with a relatively simple selective distillation technique, high yields of the ring-dealkylated thiophenol may be obtained wholly independent of the possible interim formation of undesired side products. For example, where it is desired to debutylate t-butyl 4-t-butyl-o-tolyl sulfide to recover o-thiocresol, if the reaction is carried out in an autoclave where reactants and resultant products are maintained in contact with one another, other products will be recovered along with the desired o-thiocresol. While this may not be disadvantageous for certain purposes, where the desideratum of the process is the recovery of essentially pure o-thiocresol in high yield a selective distillation technique is considerably more effective. In such a technique, the t-butyl 4-t-butyl-o-tolyl sulfide is heated in the presence of the catalyst to a ring dealkylation temperature. The column temperature and pressure are coordinately controlled so that the only product that escapes (other than evolved olefins) is the desired o-thiocresol, which will be lower boiling than the alkylated compounds. These latter compounds are returned to the distillation vessel by reflux. It has been found that a packed column provides a desired scrubbing action so that the evolved o-thiocresol is obtained in a high degree of purity, other products being returned to the vessel for reflux. It is also apparent that in removing the o-thiocresol by this technique, equilibrium is not attained, the reaction being shifted toward formation of additional o-thiocresol.

It has also been found that it is advantageous in certain instances to incorporate an inert hydrocarbon oil, preferably a high-boiling paraffin oil, in the reaction vessel. Thereby operation of the dealkylation reaction at temperatures above the atmospheric boiling point of the reactant is feasible. Also, improvements in conversion and yield, in certain instances, result.

The following examples are intended as illustrative and expository of the invention, and are not to be considered as limitations thereof.

EXAMPLE 1

*Ring Dealkylation of 4-t-Butyl-o-Thiocresol*

A sample of 4-t-butyl-o-thiocresol was recovered by selective distillation from a mixture of thiocresol isomers that had been reacted with isobutylene in the presence of boron trifluoride-phosphoric acid as catalyst. This sample was contacted with 15 weight percent of anhydrous zinc chloride. The reaction was carried out at a temperature between 240 and 260° C. (final pot temperature 350° C.) for a period of 4½ hours at atmospheric pressure. The reaction product, o-thiocresol was taken overhead with sufficient reflux so as to return unreacted 4-t-butyl-o-thiocresol to the condenser, isobutylene passing through the condenser. Sixty-nine percent of the 4-t-butyl-o-thiocresol was converted, o-thiocresol being obtained in a yield of 78 mole percent (purity of 93 percent) based on converted material.

EXAMPLE 2

*Ring Dealkylation of 4-t-Butyl-o-Thiocresol*

Following the procedure shown in Example 1, 200 grams of 4-t-butyl-o-thiocresol was reacted with 10 percent by weight of aluminum phosphate at a temperature between 240 and 260° C. (final pot temperature 295° C.) for a period of 3 hours at atmospheric pressure. A conversion of 66.2 percent of the 4-t-butyl-o-thiocresol was obtained, o-thiocresol being obtained in a yield of 48 mole percent (purity of 98 percent) based on converted material.

EXAMPLE 3

*Ring Dealkylation of o-Isopropylthiophenol* o-Isopropylthiophenol was fed continuously to the reactor via a dropping funnel attached to the side neck of a distilling flask. The flask was fitted with a paddle stirrer to improve contacting of the reactants with the catalyst and to aid in heat transfer between the walls of the reactor and the reaction mixture. Anhydrous zinc chloride (fused at reaction temperature) was used as catalyst in an amount of 24 percent based on the weight of the total material fed to the reactor. A high boiling paraffin oil was included in the reactor to permit operation at temperatures above the atmospheric boiling point of the reactant. In the packed distilling column used, the reflux ratios and column temperature were adjusted so as to return unreacted materials to the reactor. The reaction was maintained at a temperature between 272 and 322° C. for approximately 2 hours. Forty-nine percent by weight of the o-isopropylthiophenol was converted, thiophenol being recovered in a yield of 39 mole percent based on converted material.

It will of course be readily apparent that many different variants of the process of this invention may be employed with respect to the thiophenol being dealkylated together with specific reaction parameters such as catalyst concentration, reaction temperature, time of reaction, and the like. Also, a batch technique or a continuous dealkylation process may be employed as illustrated. These variants are considered as falling within the scope of this invention which should be determined in accordance with the objects and claims thereof.

I claim:

1. The process for dealkylating a thiophenol containing a nuclearly attached branched-chain alkyl group which comprises heating said thiophenol at a temperature between 150 and 500° C. in the presence of a ring dealkylation acid catalyst selected from the group consisting of anhydrous zinc chloride and anhydrous aluminum phosphate.

2. The process for dealkylating a thiophenol containing a nuclearly attached branched-chain alkyl group which comprises heating said thiophenol at a temperature between 150 and 500° C. in the presence of anhydrous zinc chloride as ring dealkylation catalyst.

3. The process for dealkylating a thiophenol containing a t-alkyl group in the para position of the ring which comprises heating said thiophenol at a temperature between 200 and 300° C. in the presence of a ring dealkylation acid catalyst selected from the group consisting of anhydrous zinc chloride and anhydrous aluminum phosphate.

4. The process for dealkylating a thiophenol containing a t-alkyl group in the para position of the ring which comprises heating said thiophenol at a temperature between 200 and 300° C. in the presence of anhydrous zinc chloride as ring-dealkylation catalyst.

5. The process for dealkylating a thiophenol containing a t-alkyl group in the para position of the ring which comprises heating said thiophenol at a temperature between 200 and 300° C. in the presence of anhydrous aluminum phosphate as ring-dealkylation catalyst.

6. The process for dealkylating a thiophenol containing a sec-alkyl group in an ortho position of the ring which comprises heating said thiophenol at a temperature between 250 and 400° C. in the presence of anhydrous zinc chloride as ring-dealkylation catalyst.

7. The process for dealkylating a thiophenol containing a nuclearly attached branched-chain alkyl group to form a lower boiling dealkylated thiophenol in high yield, which comprises charging the alkylated thiophenol and a ring dealkylation acid catalyst selected from the group consisting of anhydrous zinc chloride and anhydrous aluminum phosphate to a distillation apparatus including a reaction vessel and a distillation column, heating said alkylated thiophenol at a dealkylating temperature between 150 and 500° C. under reflux conditions, maintaining the vessel and the column at a selected temperature so that unreacted alkylated thiophenol is returned to the reaction vessel and lower boiling dealkylated thiophenol is permitted to escape from the column, and recovering said lower boiling dealkylated thiophenol in high yield.

8. The process according to claim 7 wherein an inert hydrocarbon oil is present in the reaction vessel during the dealkylation reaction.

9. The process according to claim 7 wherein said catalyst is anhydrous zinc chloride.

10. The process according to claim 7 wherein 4-t-butyl-o-thiocresol is dealkylated and o-thiocresol is recovered in high yield.

No references cited.